US010789417B1

(12) United States Patent
Huckey

(10) Patent No.: US 10,789,417 B1
(45) Date of Patent: Sep. 29, 2020

(54) METHOD AND APPARATUS FOR IDENTIFYING RELATIONSHIPS BETWEEN DOCUMENTS

(75) Inventor: Andrew Michael Huckey, Mount Pleasant, SC (US)

(73) Assignee: THE BOEING COMPANY, Chicago, IL (US)

( * ) Notice: Subject to any disclaimer, the term of this patent is extended or adjusted under 35 U.S.C. 154(b) by 1071 days.

(21) Appl. No.: 13/479,754

(22) Filed: May 24, 2012

(51) Int. Cl.
*G06F 17/00* (2019.01)
*G06F 40/134* (2020.01)

(52) U.S. Cl.
CPC ................................ *G06F 40/134* (2020.01)

(58) Field of Classification Search
CPC ............................................ G06F 17/30864
USPC ................................................ 715/205, 200
See application file for complete search history.

(56) References Cited

U.S. PATENT DOCUMENTS

| 6,356,908 | B1 * | 3/2002 | Brown | G06F 17/30899 |
| 6,539,271 | B2 | 3/2003 | Lech | |
| 6,665,838 | B1 * | 12/2003 | Brown | G06F 17/30864 707/E17.111 |
| 6,859,802 | B1 * | 2/2005 | Rui | G06F 17/30256 |
| 7,069,506 | B2 * | 6/2006 | Rosenholtz | G06F 17/30899 707/E17.119 |
| 7,188,308 | B2 | 3/2007 | Thomas | |
| 7,278,105 | B1 * | 10/2007 | Kitts | 715/736 |
| 7,584,181 | B2 * | 9/2009 | Zeng et al. | |
| 7,788,260 | B2 | 8/2010 | Lunt | |
| 7,836,050 | B2 * | 11/2010 | Jing | H04N 5/44543 707/728 |
| 8,009,921 | B2 * | 8/2011 | Csurka | G06K 9/00664 382/228 |
| 8,352,465 | B1 * | 1/2013 | Jing et al. | 707/723 |
| 8,417,712 | B2 * | 4/2013 | Narayanan | G06F 16/58 707/749 |
| 8,645,390 | B1 * | 2/2014 | Oztekin | G06F 17/30867 707/721 |
| 8,650,197 | B2 * | 2/2014 | Egnor | G06F 16/951 707/748 |
| 2004/0068486 | A1 * | 4/2004 | Chidlovskii | 707/3 |
| 2004/0255237 | A1 * | 12/2004 | Tong | G06F 17/30864 715/232 |
| 2006/0253582 | A1 * | 11/2006 | Dixon | H04L 67/20 709/225 |
| 2007/0260597 | A1 * | 11/2007 | Cramer | G06F 17/30867 |
| 2010/0332330 | A1 | 12/2010 | Goel | |

(Continued)

*Primary Examiner* — Manglesh M Patel
(74) *Attorney, Agent, or Firm* — Alston & Bird LLP

(57) ABSTRACT

A method, apparatus and computer program product are provided in order to identify relationships between documents, thereby facilitating a user's search of the documents. In the context of a method, one or more documents accessed by a user from a first document are determined. The method also determines a strength of effects value for each of the one or more documents accessed by the user from the first document based at least partially upon access by the user of the respective documents. The method also provides for a display illustrating the relationships between the first document and the one or more documents based at least partially upon the strength of effects value for the respective documents. The method may provide for the display by defining a visual representation of the one or more documents based upon the strength of effects value for the respective documents.

26 Claims, 6 Drawing Sheets

(56) References Cited

U.S. PATENT DOCUMENTS

2010/0332503 A1\* 12/2010 Buckley et al. .............. 707/759
2011/0231240 A1   9/2011 Schoen
2011/0246484 A1\* 10/2011 Dumais et al. ............... 707/749
2012/0005198 A1\*  1/2012 Pontier et al. ................ 707/723
2012/0130974 A1\*  5/2012 Leigh et al. .................. 707/706

\* cited by examiner

METHOD AND APPARATUS FOR IDENTIFYING RELATIONSHIPS BETWEEN DOCUMENTS

TECHNOLOGICAL FIELD

An example embodiment of the present disclosure relates generally to a method and apparatus for identifying relationships between documents and, more particularly, to a method, apparatus and computer program product for illustrating the relationships between documents.

BACKGROUND

The number of documents that available for review and reference by a user continues to grow. Even within an organization, the quantity of documents is oftentimes substantial and continues to increase. Faced with a large collection of documents, a user that wishes to search through the documents for a particular bit of information may have a difficult time, at least in conducting the search in an efficient manner. In this regard, a particular document of interest may be difficult to locate or the quantity of documents may cause the results of searches conducted by the user to be voluminous, thereby adversely impacting the value of the search results or at least reducing the efficiency with which the user may locate the desired information. Even in an instance in which a user locates a document that provides the desired information, the user may have difficulty repeating the search and finding the same document at some later point in time and other users may be challenged to replicate the search so as to find the same document.

Within organizations, various techniques have been developed in an effort to facilitate searching of the documents. For example, tip sheets may be compiled and maintained that provide information regarding techniques for locating and searching for information. Other techniques include process relationship diagrams or websites that serve as hubs to facilitate hyperlinking to authoritative documentation. These techniques do offer some degree of assistance to users who are searching for documents. However, users continue to be challenged in efficiently searching large quantities of documents. This is particularly true as the quantity of documents continues to grow and in instances in which a user desires to find a particular bit of information quickly or under pressure, such as during a regulatory audit. Still further, in instances in which documents are stored in multiple repositories, users may face even additional challenges in regards to the searching of documents within the different repositories that may potentially have different records information management rules as a result of rules imposed by, for example, contracts, or business or program requirements.

BRIEF SUMMARY

A method, apparatus and computer program product are therefore provided according to an example embodiment of the present disclosure in order to identify relationships between documents, thereby facilitating a user's search of the documents. In one embodiment, the method, apparatus and computer program product may provide for a display illustrating the relationships between documents. Based upon the illustrated relationships between the documents, a user may more efficiently search the documents and locate the desired information. Additionally, other users may more efficiently search documents based upon prior searches conducted by other users, and the documents accessed by those other users in response to the prior searches.

In one embodiment, a method is provided for identifying relationships between documents. The method includes determining one or more documents accessed by a user from a first document. The method also determines a strength of effects value for each of the one or more documents accessed by the user from the first document based at least partially upon access by the user of the respective documents. The method of this embodiment also provides for a display illustrating the relationships between the first document and the one or more documents based at least partially upon the strength of effects value for the respective documents. In one embodiment, the method may provide for the display by defining a visual representation of the one or more documents based upon the strength of effects value for the respective documents. In this regard, the definition of the visual representation may include sizing the visual representations based upon the strength of effects value for the respective documents.

In regards to determining one or more documents accessed by the user from the first document, the method may identify the selection by the user of a link from the first document to a respective document. In this embodiment, the method may identify each of a plurality of documents that are serially accessed by the user via selection of respective links following selection of a link from the first document. In one embodiment, the method further includes determining a measure of relevance between one or more key words of the first document and one or more key words of the one or more documents accessed by the user. In this embodiment, the determination of the strength of effects value may include determining the strength of effects value for each of the one or more documents accessed by the user from the first document based at least partially upon the measure of relevance. Additionally or alternatively, the method of one embodiment may include receiving feedback as to the relationships between the first document and the one or more documents. In this embodiment, the determination of the strength of effects value may include determining the strength of effects value for each of the one or more documents accessed by the user from the first document based at least partially upon the feedback.

The method of one embodiment also includes identifying at least one of authority for the first document, one or more modifications of the first documents or one or more documents that are indirectly related to the first document. The method of this embodiment also provides for the display of at least one of the authority for the first document, one or more modifications of the first document or one or more documents that are indirectly related to the first document that have been identified.

In another embodiment, an apparatus for identifying relationships between documents is provided. The apparatus includes a document determination module configured to determine one or more documents accessed by a user from the first document. The apparatus also includes a strength of effects module configured to determine a strength of effects value for each of the one or more documents accessed by the user from the first document based at least partially upon access by the user of the respective documents. The apparatus also includes a display module configured to provide for a display illustrating the relationships between the first document and one or more documents based at least partially upon the strength of effects value for the respective documents. In one embodiment, the display module is further configured to illustrate the relationships by defining a visual representation of the one or more documents based upon the strength of effects value for the respective documents. In this regard, the display module may be configured to define the visual representation by sizing the visual representation based upon the strength of effects value for the respective documents.

The document determination module in one embodiment is further configured to identify the selection by the user of a link from the first document to a respective document. The apparatus of one embodiment may also include a relevance determination module configured to determine a measure of relevance between one or more key words of the first document and one or more key words of the one or more documents accessed by the user. In this embodiment, the strength of effects module may be configured to determine the strength of effects value for each of the one or more documents accessed by the user from the first document based at least partially upon the measure of relevance. Additionally or alternatively, the apparatus may include a feedback module configured to receive feedback as to the relationships between the first document and one or more documents. The strength of effects module for this embodiment is configured to determine the strength of effects value for each of the one or more documents accessed by the user from the first document based at least partially upon the feedback.

The document determination module of one embodiment may be further configured to identify at least one of authority for the first document, one or more modifications of the first document or one or more documents that are indirectly related to the first document. In this embodiment, the display module may be further configured to provide for the display of at least one of the authority for the first document, one or more modifications of the first document or one or more documents that are indirectly related to the first document that have been identified.

In a further embodiment, a computer program product configured to identify relationships between documents is provided. The computer program product includes a non-transitory computer-readable storage medium having computer-readable program code stored therein that in response to execution by a processor causes an apparatus to at least determine one or more documents accessed by a user from a first document. The computer-readable program code is also configured to cause the apparatus to determine a strength of effects value for each of the one or more documents accessed by the user from the first document based at least partially upon the access by the user of the respective documents. The computer-readable program code of this embodiment is also configured to cause the apparatus to provide for a display illustrating the relationships between the first document and the one or more documents based at least partially upon the strength of effects value for the respective documents. In this regard, the apparatus may be caused to provide for the display by defining a visual representation of the one or more documents based upon the strength of effects value for the respective documents.

The apparatus of one embodiment may be caused to determine one or more documents accessed by a user from the first document by identifying the selection by the user of a link from the first document to a respective document. The apparatus of one embodiment may be further caused to determine a measure of relevance between one or more key words of the first document and one or more key words of the one or more documents accessed by the user. The apparatus of this embodiment may also be caused to determine the strength of effects value by determining the strength of effects value for each of the one or more documents accessed by the user from the first document based at least partially upon the measure of relevance.

In one embodiment, the apparatus is further caused to identify at least one of authority for the first document, one or more modifications of the first document or one or more documents that are indirectly related to the first document. The apparatus of this embodiment may also be caused to provide for the display of at least one of the authority for the first document, one or more modifications of the first document or one or more documents that are indirectly related to the first document that have been identified.

BRIEF DESCRIPTION OF THE DRAWINGS

Figure 1:
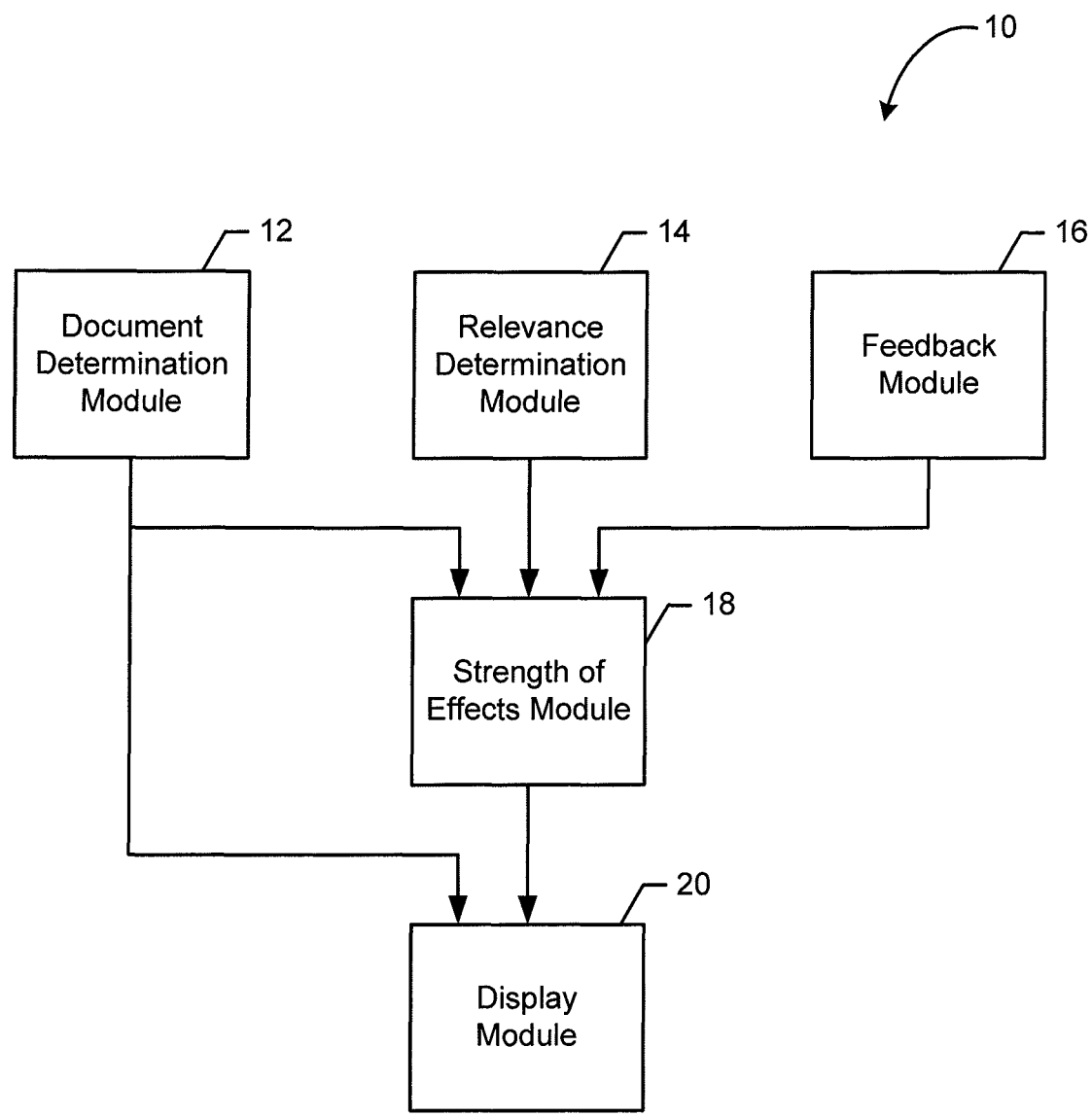
Figure 2:
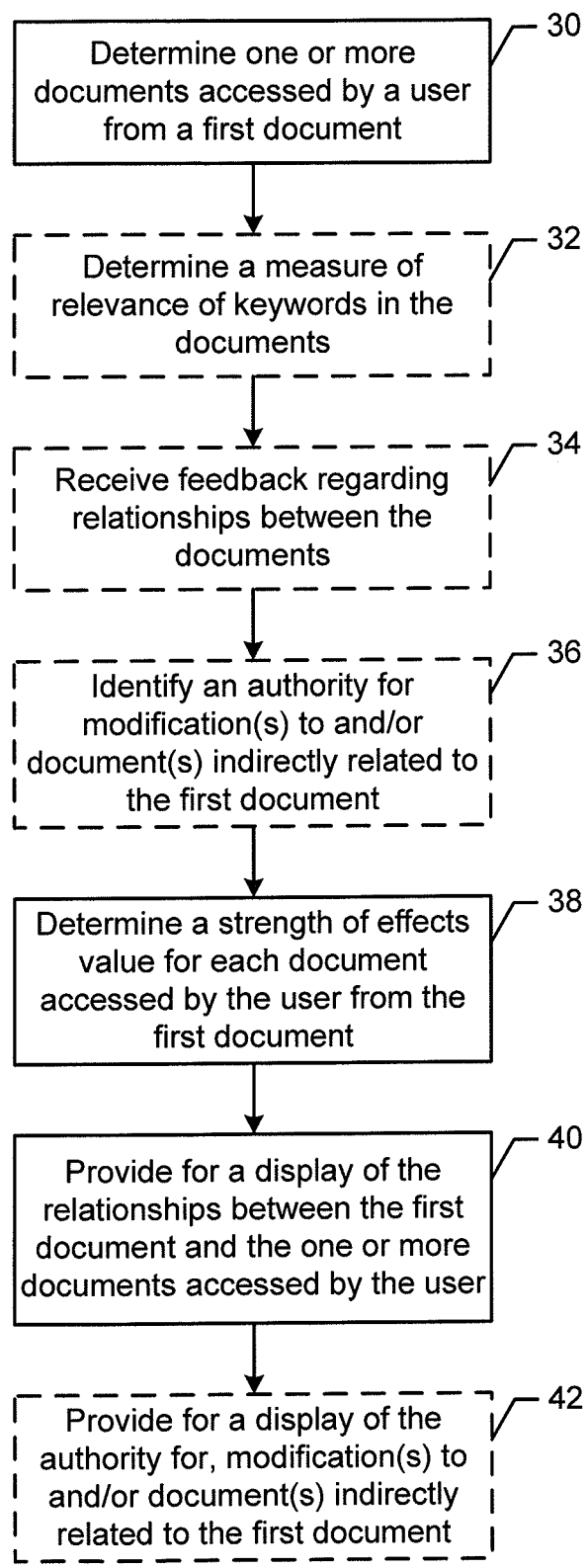
Figure 3:
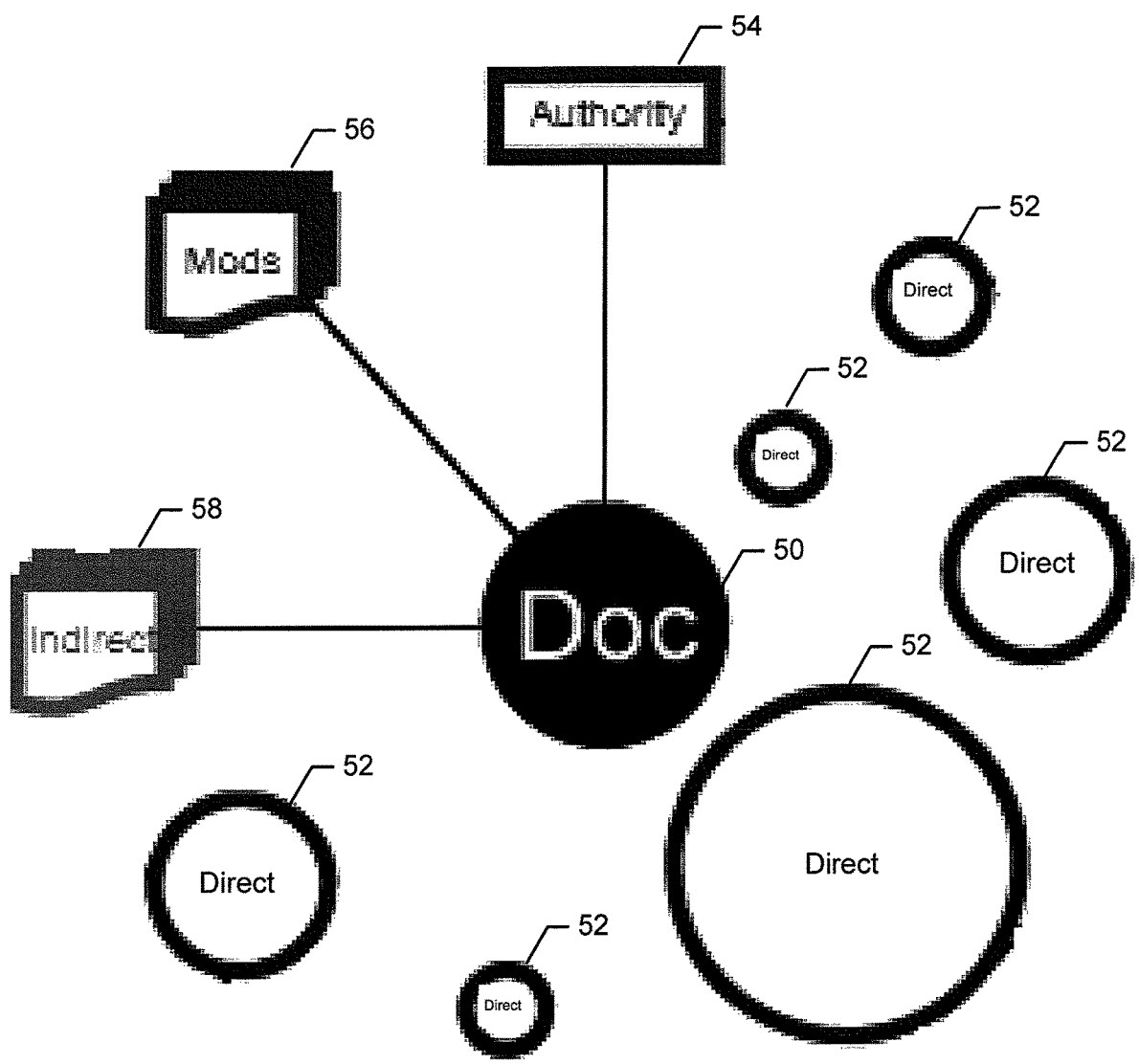
Figure 4:
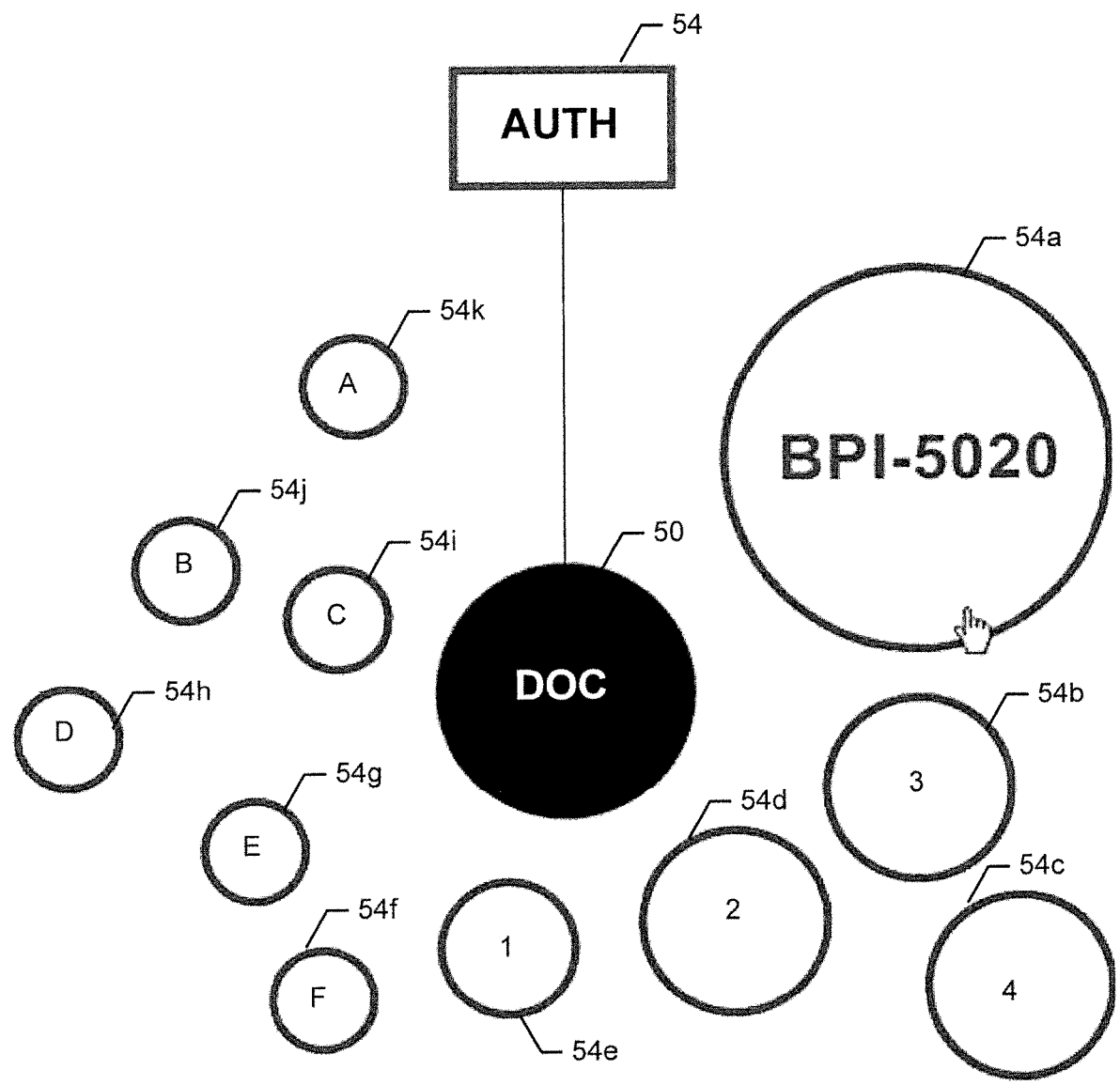
Figure 5:
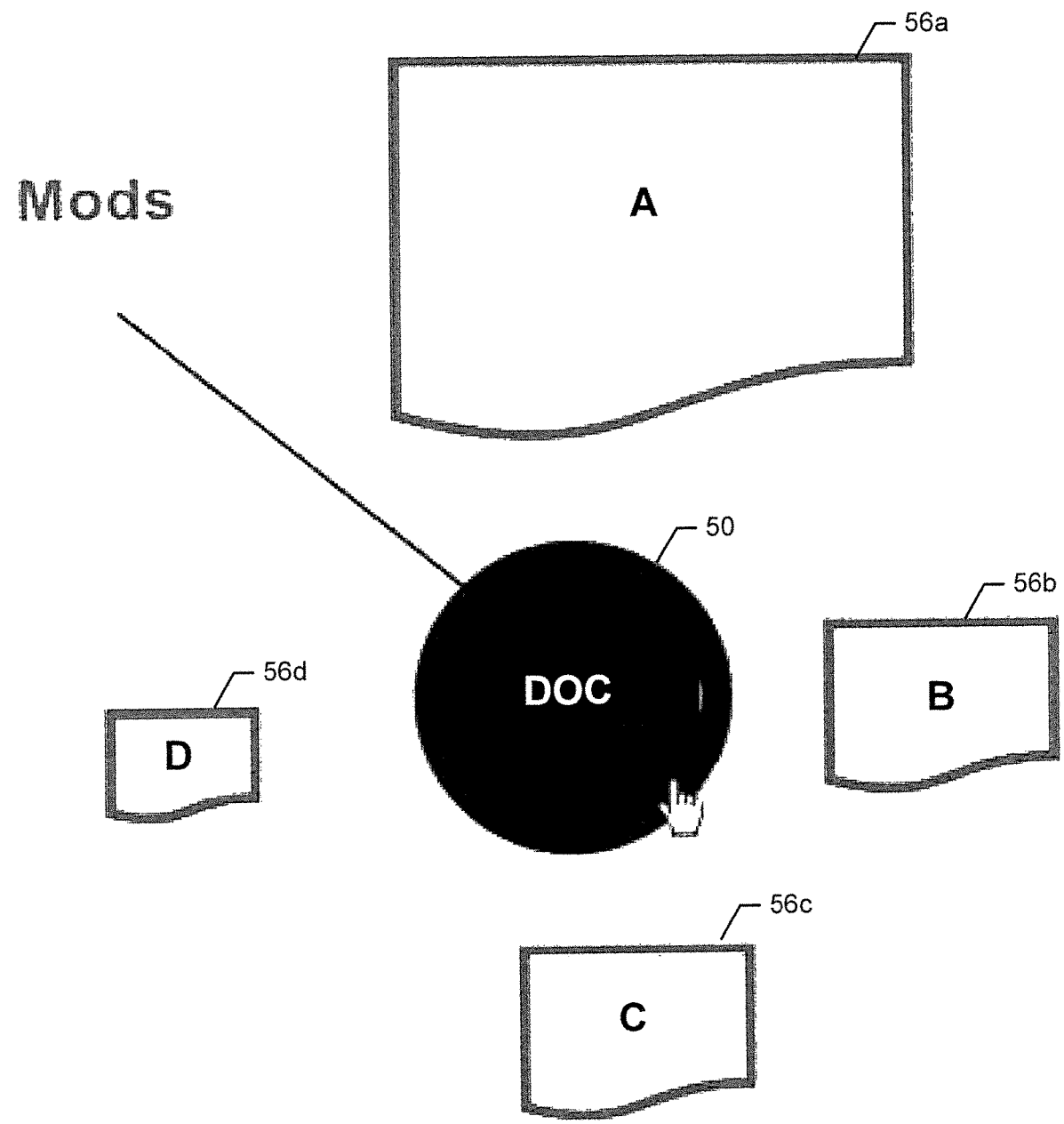
Figure 6:
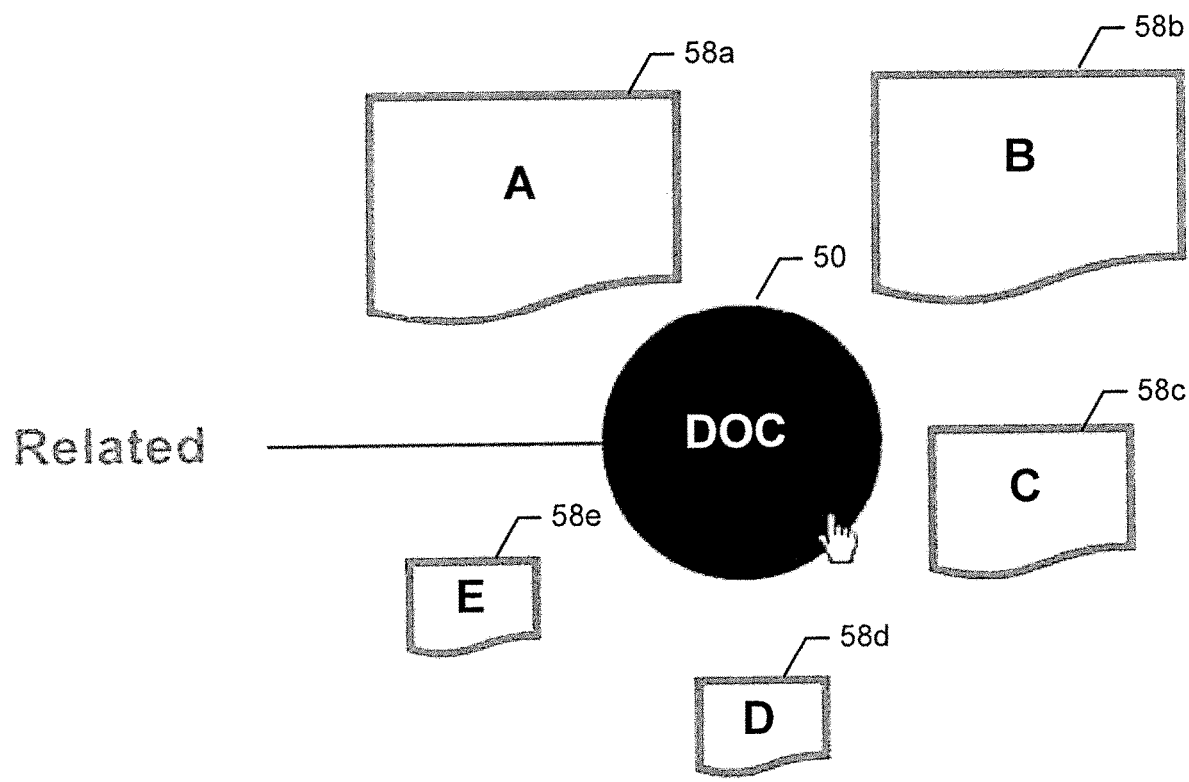

Having thus described example embodiments of the present disclosure in general terms, reference will now be made to the accompanying drawings, which are not necessarily drawn to scale, and wherein:

FIG. 1 is a schematic block diagram of system configured to identify relationships between documents in accordance with an example embodiment of the present disclosure;

FIG. 2 is a flow chart representative of operations performed in order to identify relationships between documents in accordance with an example embodiment of the present disclosure;

FIG. 3 is a display illustrating the relationships between the first document and one or more other documents that may be generated in accordance with an example embodiment of the present disclosure;

FIG. 4 is a display of the authority for the first document that may be generated in accordance with an example embodiment of the present disclosure;

FIG. 5 is a display of a plurality of modifications of the first document that may be generated in accordance in an example embodiment of the present disclosure;

FIG. 6 is a display of one or more documents that are indirectly related to the first document that may be generated in accordance with an example embodiment of the present disclosure.

DETAILED DESCRIPTION

The present disclosure now will be described more fully with reference to the accompanying drawings, in which some, but not all embodiments of the invention are shown. This disclosure may be embodied in many different forms and should not be construed as limited to the embodiments set forth; rather, these embodiments are provided so that this disclosure will be thorough and complete, and will fully convey the scope of the invention to those skilled in the art. Like numbers refer to like elements throughout.

Throughout this specification and in the claims which follow, unless the context requires otherwise, the word "comprise" and its variations such as "comprises" and "comprising" shall be understood to imply the inclusion of one or more integers, functions, operations, steps or the like but not to the exclusion of any other integers, functions, operations, steps or the like. Similarly, unless the context requires otherwise, the word "include" and its variations such as "includes" and "including" shall be understood to be synonymous with the word "comprising" and its variations.

The method, apparatus and computer program product of an example embodiment identify relationships between documents, thereby facilitating a user's search of the documents. In one embodiment, the method, apparatus and computer program product may provide for a display illustrating the relationships between documents, such that searching and review of the documents becomes both intuitive and efficient. As explained below, the apparatus of example embodiments of the present disclosure may include or otherwise be in communication with a number of modules configured to perform respective operations described herein. Although shown as separate modules, it should be understood that the operations performed by more than one module may be integrated within and instead performed by a single module, such as by a computer. It should also be understood that operations performed by one module may be separated and instead performed by more than one module.

A module may be embodied as various means for implementing the various functionalities of example embodiments of the present disclosure. A module may include, for example, one or more processors, memory devices, input/output (I/O) interfaces, communications interfaces and/or user interfaces. The processor may include, for example, one or more of a microprocessor, a coprocessor, a controller, a special-purpose integrated circuit such as, for example, an ASIC (application specific integrated circuit), an FPGA (field programmable gate array), DSP (digital signal processor), or a hardware accelerator, processing circuitry or other similar hardware. According to one example embodiment, the processor may be representative of a plurality of processors, or one or more multi-core processors, operating individually or in concert. A multi-core processor enables multiprocessing within a single physical package. Examples of a multi-core processor include two, four, eight, or greater numbers of processing cores. Further, the processor may be comprised of a plurality of transistors, logic gates, a clock (e.g., oscillator), other circuitry, and the like to facilitate performance of the functionality described herein. The processor may, but need not, include one or more accompanying digital signal processors (DSPs). A DSP may, for example, be configured to process real-world signals in real time independent of the processor. Similarly, an accompanying ASIC may, for example, be configured to perform specialized functions not easily performed by a more general purpose processor. In some example embodiments, the processor is configured to execute instructions stored in the memory device or instructions otherwise accessible to the processor. The processor may be configured to operate such that the processor causes the module to perform various functionalities described herein.

Whether configured as hardware alone or via instructions stored on a computer-readable storage medium, or by a combination thereof, the processor may be an apparatus embodying or otherwise configured to perform operations of a module according to embodiments of the present disclosure while accordingly configured. Thus, in example embodiments where the processor is embodied as, or is part of, an ASIC, FPGA, or the like, the module is specifically configured hardware for conducting the operations described herein. Alternatively, in example embodiments where the processor is embodied as an executor of instructions stored on a computer-readable storage medium, the instructions specifically configure the module to perform the algorithms and operations described herein. In some example embodiments, the processor is a processor of a specific device configured for employing example embodiments of the present disclosure by further configuration of the processor via executed instructions for performing the algorithms, methods, and operations described herein.

The memory device of a module may be one or more computer-readable storage media that may include volatile and/or non-volatile memory. In some example embodiments, the memory device includes Random Access Memory (RAM) including dynamic and/or static RAM, on-chip or off-chip cache memory, and/or the like. Further, the memory device may include non-volatile memory, which may be embedded and/or removable, and may include, for example, Read-Only Memory (ROM), flash memory, magnetic storage devices (e.g., hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor of the module.

Further, the memory device of a module may be configured to store information, data, applications, computer-readable program code instructions, and/or the like for enabling the module to carry out various functions in accordance with example embodiments of the present disclosure described herein. For example, the memory device may be configured to buffer input data for processing by the processor of the module. Additionally, or alternatively, the memory device may be configured to store instructions for execution by the processor. The memory may be securely protected, with the integrity of the data stored therein being ensured. In this regard, data access may be checked with authentication and authorized based on access control policies.

The I/O interface of a module may be any device, circuitry, or means embodied in hardware, software or a combination of hardware and software that is configured to interface the processor of the module with other circuitry or devices, such as the communications interface and/or the user interface of the module. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the module to perform, various functionalities of an example embodiment of the present disclosure.

The communication interface of a module may be any device or means embodied in hardware, software or a combination of hardware and software that is configured to receive and/or transmit data from/to one or more networks and/or any other device or module in communication with the respective module. The communications interface may be configured to provide for communications in accordance with any of a number of wired or wireless communication standards. The communications interface may also be configured to support communications at the network layer, possibly via Internet Protocol (IP). The processor of the module may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. The module of one example may communicate via the communication interface with various other network elements in a device-to-device fashion and/or via indirect communications.

The user interface of a module may be in communication with the processor of the module to receive user input via the user interface and/or to present output to a user as, for example, audible, visual, mechanical or other output indications. The user interface may include, for example, a keyboard, a mouse, a joystick, a display (e.g., a touch screen display), a microphone, a speaker, or other input/output mechanisms. Further, the processor may comprise, or be in communication with, user interface circuitry configured to control at least some functions of one or more elements of the user interface. The processor and/or user interface circuitry may be configured to control one or more functions of one or more elements of the user interface through computer program instructions (e.g., software and/or firmware) stored on a memory accessible to the processor (e.g., the memory device of the module). In some example embodiments, the user interface circuitry is configured to facilitate user control of at least some functions of the module through the use of a display and configured to respond to user inputs. The processor may also comprise, or be in communication with, display circuitry configured to display at least a portion of a user interface, the display and the display circuitry configured to facilitate user control of at least some functions of the apparatus.

As described herein, the method, apparatus and computer program product of an example embodiment may identify relationships, e.g., relatedness, between documents, thereby facilitating a user's search of the documents. The relationships may be identified based upon prior searching and review of the documents by the user or third parties. As such, the relationships may dynamically evolve over time as additional searches of the collection of the documents are performed. The method, apparatus and computer program product of an example embodiment may be utilized in a variety of contexts, such as within an organization in order to facilitate the searching of the ever expanding collection of documents maintained by the organization.

Reference is now made to FIG. 1, which illustrates an apparatus 10 for identifying relationships between documents according to one example embodiment of the present disclosure. As shown, the apparatus 10 for identifying relationships between documents according to an example embodiment of the present disclosure may include a document determination module 12 configured to determine one or more documents that are accessed by a user from a first document. See also block 30 of FIG. 2, which illustrates the operations performed by the apparatus 10 in accordance with an example embodiment. In this regard, the first document may be the result of a search conducted by a user of a document database. Alternatively, the first document may be a document reviewed by a user that relates to the subject of interest for the user and that serves as a point of reference from which the user attempts to determine other related documents.

In one embodiment, the first document references one or more other documents. For example, the first document may include links, such as hyperlinks, to other documents that relate to or otherwise provide more information regarding the subject matter of the first document. As such, the user who is reviewing the first document may access one or more other documents from the first document by, for example, actuating a link, such as a hyperlink, within the first document so as to access another document. Thus, the document determination module 12 of this embodiment may be configured to identify the selection by the user of a link from the first document to another document, which is then considered to have been accessed from the first document.

In one embodiment, the user may repeat this process by serially accessing a plurality of documents, such as by actuating a link, such as a hyperlink, within the document that they are reviewing in order to access another document, and then repeating the process within the another document in order to access yet another document. By way of example, the first document may be designated as document A and may include a hyperlink to document B. The user may actuate the hyperlink associated with document B in order to access document B. Document B may, in turn, include a hyperlink to document C. As such, the user who is reviewing document B may actuate the hyperlink to document C in order to access document C. Document C, in turn, may include a hyperlink to document D such that the user who is reviewing document C may actuate the hyperlink to document D in order to access document D. Thus, the document determination module 12 of one embodiment may determine that the plurality of documents that are serially accessed by the user via the selection of links within the respective documents have all been accessed from the first document, that is, documents B, C and D in the foregoing example have all been accessed by the user from document A.

The apparatus 10 of one embodiment may also include a strength of effects module 18 configured to determine a strength of effects value for each of the documents accessed by the user from the first document. See block 38 of FIG. 2. In this regard, the strength of effects module 18 is configured to determine the strength of the effects value for each document based at least partially upon access by the user of the respective document. The manner in which the strength of effects module 18 determines the strength of effects value for each document may be based upon various factors associated with access by the user of the respective document. For example, the strength of effects module 18 may define the strength of effects value for a respective document based upon the number of times that a user accesses a respective document from the first document. In this regard, the strength of effects module 18 may be configured to assign a strength of effects value that is proportional to the number of times that a user accesses a respective document from the first document, thereby assigning a greater strength of effects value to a document that is accessed from the first document a greater number of times than other documents. Additionally or alternatively, the strength of effects module 18 may define the strength of effects value for a respective document based upon the frequency with which a user viewing the first document accesses the respective document. As such, the strength of effects module 18 may be configured to assign a strength of effects value that is proportional to the frequency with which a user accesses a respective document from the first document, thereby assigning a greater strength of effects value to a document that is accessed more frequently from the first document than other documents.

Frequency may be defined in various manners including the percentage of instances in which a respective document was accessed from the first document in comparison to either the total number of instances that the first document was accessed/viewed or the total number of instances that other documents (including the respective document) were accessed from the first document. Alternatively, frequency may be defined based on the number of instances that a respective document was accessed from the first document within a predefined period of time.

The strength of effects module 18 of one embodiment may also or alternatively define the strength of effects value for a respective document based upon the time, e.g., the dwell time, that the user spends viewing the respective document following its access from the first document. In this regard, the strength of effects module 18 may be configured to assign a strength of effects value that is proportional to the dwell time, thereby assigning a greater strength of effects value to a document that is accessed from the first document and is viewed for a longer period of time than other documents. Further, the strength of effects module 18 of one embodiment may additionally or alternatively define the strength of effects value for a respective document based upon the proximity of the respective document to the first document in a situation in which the user serially accesses a number of documents from the first document. As such, the strength of effects module 18 may be configured to assign a strength of effects value that is proportional to the proximity of a respective document from the first document, thereby assigning a greater strength of effects value to a document that is accessed directly from the first document than other documents that are accessed indirectly from the first document, such as via a second link, a third link, etc.

In other embodiments, the strength of effects module 18 may take into account other factors relating to the documents accessed by the user from the first document in its determination of the strength of effects value for the respective documents. As such, the apparatus 10 of one embodiment may include a relevance determination module 14 that is configured to determine a measure of relevance between one or more keywords of the first document and one or more keywords of the documents accessed by the user from the first document. See block 32 of FIG. 2. In this regard, the relevance determination module 14 may be configured to assign an increased measure of relevance in an instance in which one or more of the keywords of the first document and one or more of the keywords of a document accessed from the first document are the same or similar or otherwise related. Conversely, the relevance determination module 14 may be configured to assign a reduced measure of relevance in an instance in which one or more of the keywords of the first document and one or more of the keywords of a document accessed from the first document are not the same or similar and are not otherwise related.

In this embodiment, the strength of effects module 18 may be configured to determine the strengths of effects value for each of the documents accessed by the user from the first document based on at least partially upon the measure of relevance of the respective documents. For example, the strength of effects module 18 of this embodiment may be configured to assign a strength of effects value that is also proportional to the measure of relevance of the respective document, thereby increasing the strength of effects value for a respective document in an instance in which the measure of relevance of the respective document is large and reducing the strength of effects value for a respective document in an instance in which the measure of relevance is smaller.

Additionally or alternatively, the apparatus 10 may include a feedback module 16 configured to receive feedback as to the relationships between the first document and one or more documents accessed from the first document. See block 34 of FIG. 2. In this regard, the feedback module 16 may receive feedback from the user indicating the relevance of the respective document, such as by indicating that the document is highly relevant, marginally relevant, irrelevant or the like or by assigning a numerical value to the relevance of the respective document. In this embodiment, the strength of effects module 18 may be configured to determine the strength of effects value for each of the documents accessed by the user from the first document based at least partially upon the feedback. For example, the strength of effects module 18 of this embodiment may be configured to assign a strength of effects value that is proportional to the relevancy of the respective document, thereby increasing in instances in which the feedback indicates that the respective document is very relevant and decreasing in an instance in which the feedback indicates that the respective document is irrelevant.

Although the apparatus 10 of the illustrated embodiment is shown to include a document determination module 12, a relevance determination module 14 and a feedback module 16, the apparatus of various embodiments may include various combinations of the relevance determination module and the feedback module. For example, the apparatus 10 of one embodiment need not include the relevance determination module 14 and the feedback module 16 or may include either one of the relevance determination module and the feedback module or may include both of the relevance determination module and the feedback module in addition to the document determination module 12.

The apparatus 10 also includes a display module 20 configured to provide for a display illustrating the relationships between the first document and the one or more documents that were accessed from the first document. See block 40 of FIG. 2. In this regard, the relationships between the first document and the documents accessed from the first document are based at least partially upon the strength of effects values for the respective documents. In one embodiment, the display module 20 is configured to define a visual representation of the one or more documents accessed from the first document with a visual representation being based upon the strength of effects value for the respective documents.

As shown in FIG. 3, for example, an affinity rose diagram may be provided by the display module 20 to illustrate the relationships between the first document 50 and the other documents 52 accessed therefrom. In this regard, the first document 50 may be illustrated in the center of the affinity rose diagram with the other documents 52 accessed from the first document being shown around the first document, such as within the arc between 12 o'clock and 9 o'clock in the illustrated embodiment.

The relationships of the documents 52 accessed from the first document 50 to the first document, such as the relevance of the documents accessed from the first document, may be visually represented in various manners including by the positioning of the representations of the other documents in an ordered sequence, such as from most relevant to least relevant. Alternatively, the relationships of the documents 52 accessed from the first document 50 to the first document may be visually represented by the spacing, e.g., the radial spacing, of the representations of the documents accessed from the first document to the first document with the representations of the other documents that are closer to the first document being of more relevance than those that are positioned at a greater distance from the first document.

In the illustrated embodiment, however, the display module 20 is configured to define the visual representations of the respective documents 52 and their relationship to the first document 50 by sizing the visual representations based upon the strength of effects value for the respective documents, such as in a manner proportional to the strength of effects value. In the illustrated embodiment, for example, the size of the circle representing a respective document is proportional to the strength of effects value with a document 52 accessed from the first document 50 that is represented with a larger circle having a larger strength of effects value so as to generally indicate that he respective document has a closer relationship and, is, therefore, more relevant to the first document than another document accessed from the first document that is represented by a smaller circle. As such, a user may quickly and intuitively determine which of the documents 52 that may be accessed from the first document 50 have been found in the past, such as during prior searches by the user or by third parties, to be more relevant. Thus, a user may more quickly and efficiently locate relevant documents, even in an instance in which the collection of documents continues to grow.

In one embodiment, the documents 52 that may be accessed from the first document 50 may be filtered by the display module 20 based upon a role or function performed by the user who is performing the search, thereby displaying only those documents that are relevant to the role or function of the user. For example, the documents 52 that may be accessed from the first document 50 may be filtered such that only those documents relating to finance, quality, manufacturing, liason, etc. are displayed depending upon the role or function of the user. In other embodiments, the display module 20 may be configured to filter the documents 52 based upon one or more other parameters, such as based upon a date range.

In addition to providing for the display of the relationships between the first document 50 and the one or more documents 52 accessed from the first document, the apparatus 10 of one embodiment may also depict other types of documents that bear a relationship to the first document. See block 36 of FIG. 2. In this embodiment, the document determination module 12 may be configured to identify an authority 54 for the first document 50. In this regard, the authority 54 for the first document 50 may include one or more documents, such as policies, procedures, rules, regulations, standards or the like, that provide the underlying authority for the information provided by the first document. The document determination module 12 of one embodiment may also or alternatively be configured to identify one or more modifications 56 of the first document 50. In this regard, the modifications 56 include one or more documents that serve to modify at least some of the information provided by the first document 50. The document determination module 12 may also or alternatively be configured to identify one or more documents 58 that are indirectly related to the first document 50. In this regard, documents 58 that are indirectly related to the first document 50 are documents that provide supportive material that, while not directly related to the first document in the sense that the indirectly related documents do not explicitly describe one or more sub-parts of the first document, may add clarity to the user. By way of example in which the first document 50 describes a process, the documents 52 that are accessed from the first document may be direly related to the process described by the first document and may explicitly describe the sub-parts of the process, such as the technique for performing one or more steps of the process. Continuing with this example, the indirectly related documents 58 may be supportive even though they are not directly related to the process and may be related, for example, to a similar process performed in conjunction with a different product or may mention or otherwise make reference to the process.

The display module 20 of this embodiment may also be configured to provide for the display of the authority 54 for the first document 50, one or more modifications 56 of the first document and/or one or more documents 58 that are indirectly related to the first document, as shown in FIG. 3. See block 42 of FIG. 2.

A user presented with the display, such as shown in FIG. 3, of the relationships between the first document 50 and one or more documents 52 that may be accessed from the first document as well as optionally the authority 54 for the first document, one or more modifications 56 of the first document and/or one or more documents 58 that are indirectly related to the first document may be utilized by a user in order to efficiently access those documents. For example, the documents 52 that are accessible from the first document 50 may be accessed from the display, such as from the affinity rose diagram of FIG. 3, by selecting, e.g., clicking upon, the representation of the respective document. Similarly, the authority 54 for the first document 50, the one or more modifications 56 of the first document and one or more documents 58 that are indirectly related to the first document may be accessed by actuating, such as by clicking upon, the representation of the respective type of document.

As shown in FIG. 4, the selection of the representation of the authority 54 for the first document 50 may illustrate each of the documents that serve as authority for the first document arranged or positioned relative to representation of the first document. As described above, the representations of the documents 54a-54k that serve as authority 54 for the first document 50 may visually depict the relationship between the first document and the documents that serve as authority for the first document, such as by appropriately sizing the representations of the documents that serve as authority for the first document. In the illustrated embodiment, the size of the documents 54a-54k that serve as authority 54 is proportional to the relevance of documents to the first document 50 with larger circles indicating or representing documents that serve as authority for the first document that have a closer relationship, e.g., more relevant, to the first document. In this regard, the determination of the relationship, such as the relevance, of a document that serves as authority 54 for the first document 50 to the first document may be determined in any of the manners described above and the relationships of the first document to any of the documents that serve as authority for the first document may be provided, such as by being visually represented, in any of the other manners described above.

As shown in FIG. 5, the selection of the modifications 56 to the first document 50 may illustrate each of the documents 56a-56d that modify the first document arranged or positioned relative to representation of the first document. As described above, the representations of the modifications 56 to the first document 50 may visually depict the relationship between the first document and the modifications to the first document, such as by appropriately sizing the representations of the modifications to the first document. In the illustrated embodiment, the size of the modifications 56 is proportional to the relevance of modifications to the first document 50 with larger files indicating or representing modifications to the first document that have a closer relationship, e.g., more relevant, to the first document. In this regard, the determination of the relationship, such as the relevance, of a modification 56 to the first document 50 may be determined in any of the manners described above and the relationships of the first document to the modifications to the first document may be provided, such as by being visually represented, in any of the other manners described above.

As shown in FIG. 6, the selection of the representation of the documents 58 that are indirectly related to the first document 50 may illustrate each of the indirectly related documents 58a-58e arranged or positioned relative to representation of the first document. As described above, the representations of the documents 58 that are indirectly related to the first document 50 may visually depict the relationship between the first document and the indirectly related documents 58a-58e, such as by appropriately sizing the representations of the documents that are indirectly related to the first document. In the illustrated embodiment, the size of the indirectly related documents 58 is proportional to the relevance of documents to the first document 50 with larger files indicating or representing documents that are indirectly related to the first document that have a closer relationship, e.g., more relevant, to the first document. In this regard, the determination of the relationship, such as the relevance, of an indirectly related document 58 to the first document 50 may be determined in any of the manners described above and the relationships of the first document to any of the documents that are indirectly related to the first document may be provided, such as by being visually represented, in any of the other manners described above.

As described, a method, apparatus and computer program product are provided according to an example embodiment of the present disclosure in order to identify relationships between documents, thereby facilitating a user's search of the documents. In one embodiment, the method, apparatus and computer program product may provide for a display illustrating the relationships between documents. Based upon the illustrated relationships between the documents, a user may more efficiently search the documents and locate the desired information. Additionally, other users may more efficiently search documents based upon prior searches conducted by other users, and the documents accessed by those other users in response to the prior searches.

FIGS. 1 and 2 illustrate block diagrams of example apparatuses, methods and/or computer program products according to example embodiments. It will be understood that each module of the block diagrams, and/or combinations of modules in the block diagrams, can be implemented by various means. Means for implementing the modules of the block diagrams, combinations of the modules in the block diagrams, or other functionality of example embodiments described herein may include hardware, and/or a computer program product including a computer-readable storage medium (as opposed to a computer-readable transmission medium which describes a propagating signal) having one or more computer program code instructions, program instructions or executable computer-readable program code instructions stored therein. In this regard, program code instructions for carrying out the operations and functions of the modules of FIGS. 1 and 2 and otherwise described herein may be stored in the memory device of an example apparatus, and executed by a processor. As will be appreciated, any such program code instructions may be loaded onto a computer or other programmable apparatus (e.g., processor, memory device or the like) from a computer-readable storage medium to produce a particular machine, such that the particular machine becomes a means for implementing the functions specified in the block diagrams' modules.

These program code instructions may also be stored in a computer-readable storage medium that can direct a computer, processor or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the block diagrams' modules. The program code instructions may be retrieved from a computer-readable storage medium and loaded into a computer, processor or other programmable apparatus to configure the computer, processor or other programmable apparatus to execute operations to be performed on or by the computer, processor or other programmable apparatus. Retrieval, loading and execution of the program code instructions may be performed sequentially such that one instruction is retrieved, loaded and executed at a time. In some example embodiments, retrieval, loading and/or execution may be performed in parallel such that multiple instructions are retrieved, loaded and/or executed together. Execution of the program code instructions may produce a computer-implemented process such that the instructions executed by the computer, processor or other programmable apparatus provide operations for implementing the functions specified in the block diagrams' modules.

Accordingly, execution of instructions associated with the operations of the modules of the block diagrams by a processor, or storage of instructions associated with the modules of the block diagrams in a computer-readable storage medium, supports combinations of operations for performing the specified functions. It will also be understood that one or more modules of the block diagrams, and combinations of modules in the block diagrams, may be implemented by special purpose hardware-based computer systems and/or processors which perform the specified functions, or combinations of special purpose hardware and program code instructions.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

The invention claimed is:

1. A method of identifying relationships between documents, the method comprising:
   determining one or more documents accessed by a user from a first document;
   determining, with a processor, a strength of effects value for each of the one or more documents accessed by the user from the first document based at least partially upon access by the user of the respective documents;
   displaying a representation of the one or more documents accessed from the first document with a visual representation being based upon the strength of effects value for the respective documents;
   concurrent with the display of the representation of the one or more documents accessed from the first document, further displaying one or more representations of other categories of documents including a representation of a category including documents providing underlying authority for information provided by the first document in conjunction with the display of the representation of the one or more documents accessed from the first document, wherein the documents providing underlying authority comprise one or more policies, procedures, rules, regulations or standards that provide the underlying authority for the information provided by the first document; and in response to a selection of the representation of the category including the authority, displaying the documents that serve as authority for information provided by the first document by sizing the documents providing authority based upon relevance of the documents providing authority to the first document so as to visually depict the relevance.

2. A method according to claim 1 wherein determining one or more documents accessed by a user from the first document comprises identifying selection by the user of a link from the first document to a respective document.

3. A method according to claim 2 wherein determining one or more documents accessed by a user from the first document comprises identifying each of a plurality of documents that are serially accessed by the user via selection of respective links following selection of a link from the first document.

4. A method according to claim 1 further comprising determining a measure of relevance between one or more keywords of the first document and one or more keywords of the one or more documents accessed by the user, wherein determining the strength of effects value comprises determining the strength of effects value for each of the one or more documents accessed by the user from the first document based at least partially upon the measure of relevance.

5. A method according to claim 1 further comprising receiving feedback as to the relationships between the first document and the one or more documents, wherein determining the strength of effects value comprises determining the strength of effects value for each of the one or more documents accessed by the user from the first document based at least partially upon the feedback.

6. A method according to claim 1 wherein providing for a display comprises defining a visual representation of the one or more documents based upon the strength of effects value for the respective documents.

7. A method according to claim 6 wherein defining the visual representation comprises sizing the visual representation based upon the strength of effects value for the respective documents.

8. A method according to claim 1 wherein determining a strength of effects comprises determining the strength of effects for a respective document based upon one or more of a number of times that the respective document is accessed from the first document, a frequency with which the respective document is accessed from the first document, a dwell time associated with the respective document or a proximity of the respective document to the first document.

9. A method according to claim 1 wherein determining a strength of effects comprises determining the strength of effects for a respective document based upon a dwell time associated with the respective document.

10. A method according to claim 1 wherein the one or more representations of other categories of documents include a representation of a category including one or more documents that are indirectly related to the first document, wherein documents that are indirectly related to the first document include documents that do not explicitly describe sub-parts of the first document but that provide other supportive material, and wherein the method further comprises, in response to a selection of the representation of the category including the one or more documents that are indirectly related, displaying indirectly related documents that are indirectly related to the first document arranged relative to representation of the first document in a manner that is based upon the strength of effects value for the indirectly related documents.

11. An apparatus for identifying relationships between documents, the apparatus comprising:

a document determination module configured to determine one or more documents accessed by a user from a first document;

a strength of effects module comprising one or more processors configured to determine a strength of effects value for each of the one or more documents accessed by the user from the first document based at least partially upon access by the user of the respective documents; and a display module configured to cause a display of a representation of the one or more documents accessed from the first document with a visual representation being based upon the strength of effects value for the respective documents, wherein the display module is further configured to cause, concurrent with the display of the representation of the one or more documents accessed from the first document, a display of one or more representations of other categories of documents including a representation of a category including documents providing underlying authority for information provided by the first document in conjunction with the display of the representation of the one or more documents accessed from the first document, wherein the documents providing underlying authority comprise one or more policies, procedures, rules, regulations or standards that provide the underlying authority for the information provided by the first document; and wherein the display module is further configured, in response to a selection of the representation of the category including the authority, to cause a display of an illustration of the documents that serve as authority for information provided by the first document by sizing the documents providing authority based upon relevance of the documents providing authority to the first document so as to visually depict the relevance.

12. An apparatus according to claim 11 wherein the document determination module is further configured to identify selection by the user of a link from the first document to a respective document.

13. An apparatus according to claim 11 further comprising a relevance determination module configured to determine a measure of relevance between one or more keywords of the first document and one or more keywords of the one or more documents accessed by the user, wherein the strength of effects module is configured to determine the strength of effects value for each of the one or more documents accessed by the user from the first document based at least partially upon the measure of relevance.

14. An apparatus according to claim 11 further comprising a feedback module configured to receive feedback as to the relationships between the first document and the one or more documents, wherein the strength of effects module is configured to determine the strength of effects value for each of the one or more documents accessed by the user from the first document based at least partially upon the feedback.

15. An apparatus according to claim 11 wherein the display module is further configured to define a visual representation of the one or more documents based upon the strength of effects value for the respective documents.

16. An apparatus according to claim 15 wherein the display module is further configured to define the visual representation by sizing the visual representation based upon the strength of effects value for the respective documents.

17. An apparatus according to claim 11 wherein the strength of effects module is further configured to determine the strength of effects for a respective document based upon one or more of a number of times that the respective document is accessed from the first document, a frequency with which the respective document is accessed from the first document, a dwell time associated with the respective document or a proximity of the respective document to the first document.

18. An apparatus according to claim 11 wherein the strength of effects module is configured to determine a strength of effects by determining the strength of effects for a respective document based upon a dwell time associated with the respective document.

19. An apparatus according to claim 11 wherein the one or more representations of other categories of documents include a representation of a category including one or more documents that are indirectly related to the first document, wherein documents that are indirectly related to the first document include documents that do not explicitly describe sub-parts of the first document but that provide other supportive material, and wherein the display module is further configured, in response to a selection of the representation of the category including the one or more documents that are indirectly related, to display indirectly related documents that are indirectly related to the first document arranged relative to representation of the first document in a manner that is based upon the strength of effects value for the indirectly related documents.

20. A computer program product configured to identify relationships between documents, the computer program product comprising a non-transitory computer-readable storage medium having computer-readable program code stored therein that in response to execution by a processor cause an apparatus to at least:
 determine one or more documents accessed by a user from a first document;
 determine a strength of effects value for each of the one or more documents accessed by the user from the first document based at least partially upon access by the user of the respective documents
 display a representation of the one or more documents accessed from the first document with a visual representation being based upon the strength of effects value for the respective documents;
 concurrent with the display of the representation of the one or more documents accessed from the first document, further display one or more representations of other categories of documents including a representation of a category including documents providing underlying authority for information provided by the first document in conjunction with the display of the representation of the one or more documents accessed from the first document, wherein the documents providing underlying authority comprise one or more policies, procedures, rules, regulations or standards that provide the underlying authority for the information provided by the first document; and
 in response to a selection of the representation of the category including the authority, display an illustration of the documents that serve as authority for information provided by the first document by sizing the documents providing authority based upon relevance of the documents providing authority to the first document so as to visually depict the relevance.

21. A computer program product according to claim 20 wherein the apparatus is caused to determine one or more documents accessed by a user from the first document by identifying selection by the user of a link from the first document to a respective document.

22. A computer program product according to claim 20 wherein the apparatus is further caused to determine a measure of relevance between one or more keywords of the first document and one or more keywords of the one or more documents accessed by the user, wherein the apparatus is caused to determine the strength of effects value by determining the strength of effects value for each of the one or more documents accessed by the user from the first document based at least partially upon the measure of relevance.

23. A computer program product according to claim 20 wherein the apparatus is caused to provide for a display by defining a visual representation of the one or more documents based upon the strength of effects value for the respective documents.

24. A computer program product according to claim 20 wherein the apparatus is caused to determine the strength of effects for a respective document based upon one or more of a number of times that the respective document is accessed from the first document, a frequency with which the respective document is accessed from the first document, a dwell time associated with the respective document or a proximity of the respective document to the first document.

25. A computer program product according to claim 20 wherein the apparatus is caused to determine a strength of effects by determining the strength of effects for a respective document based upon a dwell time associated with the respective document.

26. A computer program product according to claim 20 wherein the one or more representations of other categories of documents include a representation of a category including one or more documents that are indirectly related to the first document, wherein documents that are indirectly related to the first document include documents that do not explicitly describe sub-parts of the first document but that provide other supportive material, and wherein the apparatus is further caused, in response to a selection of the representation of the category including the one or more documents that are indirectly related, to display indirectly related documents that are indirectly related to the first document arranged relative to representation of the first document in a manner that is based upon the strength of effects value for the indirectly related documents.

\* \* \* \* \*